United States Patent
Wang et al.

(10) Patent No.: US 12,079,914 B2
(45) Date of Patent: Sep. 3, 2024

(54) KINEMATIC INTERACTION SYSTEM WITH IMPROVED POSE TRACKING

(71) Applicant: Intel Corporation, Santa Clara, CA (US)

(72) Inventors: Shandong Wang, Beijing (CN); Yangyuxuan Kang, Beijing (CN); Anbang Yao, Beijing (CN); Ming Lu, Beijing (CN); Yurong Chen, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/914,314

(22) PCT Filed: Apr. 23, 2020

(86) PCT No.: PCT/CN2020/086412
§ 371 (c)(1),
(2) Date: Sep. 23, 2022

(87) PCT Pub. No.: WO2021/212411
PCT Pub. Date: Oct. 28, 2021

(65) Prior Publication Data
US 2023/0154092 A1 May 18, 2023

(51) Int. Cl.
*G06T 13/40* (2011.01)
*G06T 7/246* (2017.01)
(Continued)

(52) U.S. Cl.
CPC ............... *G06T 13/40* (2013.01); *G06T 7/70* (2017.01); *G06T 7/251* (2017.01); *G06T 17/00* (2013.01);
(Continued)

(58) Field of Classification Search
CPC . G06T 13/40; G06T 7/70; G06T 2207/10024; G06T 2207/20084;
(Continued)

(56) References Cited

U.S. PATENT DOCUMENTS

2009/0232353 A1* 9/2009 Sundaresan ............. G06T 7/251
　　　　　　　　　　　　　　　　　　　348/42
2016/0088284 A1* 3/2016 Sareen ....................... G06T 3/60
　　　　　　　　　　　　　　　　　　　348/47

(Continued)

FOREIGN PATENT DOCUMENTS

CN　　　103942829 A　　7/2014
CN　　　104680582 A　　6/2015
(Continued)

OTHER PUBLICATIONS

Mehta et al, "VNect Real-time 3D Human Pose Estimation with a Single RGB Camera", 2017, ACM (Year: 2017).*

(Continued)

*Primary Examiner* — YuJang Tswei
(74) *Attorney, Agent, or Firm* — Hanley, Flight & Zimmerman, LLC

(57) ABSTRACT

Techniques are disclosed for providing improved pose tracking of a subject using a 2D camera and generating a 3D image that recreates the pose of the subject. A 3D skeleton map is estimated from a 2D skeleton map of the subject using, for example, a neural network. A template 3D skeleton map is accessed or generated having bone segments that have lengths set using, for instance, anthropometry statistics based on a given height of the template 3D skeleton map. An improved 3D skeleton map is then produced by at least retargeting one or more of the plurality of bone segments of the estimated 3D skeleton map to more closely match the corresponding template bone segments of the template 3D skeleton map. The improved 3D skeleton map (Continued)

can then be animated in various ways (e.g., using various skins or graphics) to track corresponding movements of the subject.

25 Claims, 8 Drawing Sheets

(51) Int. Cl.
    *G06T 7/70*         (2017.01)
    *G06T 17/00*      (2006.01)

(52) U.S. Cl.
    CPC ............... *G06T 2207/10024* (2013.01); *G06T 2207/20081* (2013.01); *G06T 2207/20084* (2013.01); *G06T 2207/30196* (2013.01)

(58) Field of Classification Search
    CPC . G06T 2207/30196; G06T 2207/20081; G06T 7/251; G06T 17/00
    See application file for complete search history.

(56) References Cited

U.S. PATENT DOCUMENTS

| | | | | |
|---|---|---|---|---|
| 2017/0266491 | A1* | 9/2017 | Rissanen | ............... G09B 19/003 |
| 2017/0337732 | A1 | 11/2017 | Tamersoy et al. | |
| 2018/0024641 | A1* | 1/2018 | Mao | ....................... A63F 13/428 382/103 |
| 2019/0295305 | A1 | 9/2019 | Yang et al. | |

FOREIGN PATENT DOCUMENTS

| | | |
|---|---|---|
| CN | 110827383 A | 2/2020 |
| JP | 2013533537 A | 8/2013 |
| KR | 100753965 B1 | 8/2007 |
| WO | 202000096 A1 | 1/2020 |

OTHER PUBLICATIONS

Davis et al., "A Sketching Interface for Articulated Figure Animation", 2003, Eurographics (Year: 2003).*
International Searching Authority, "International Search Report," issued in connection with PCT Application No. PCT/CN2020/086412, dated Jan. 27, 2021, 4 pages.
International Searching Authority, "Written Opinion," issued in connection with PCT Application No. PCT/CN2020/086412, dated Jan. 27, 2021, 4 pages.
International Searching Authority, "International Preliminary Report on Patentability," issued in connection with International Patent Application No. PCT/CN2020/086412, dated Nov. 3, 2022, 6 Pages.
Sun et al., "Compositional Human Pose Regression," Proceedings of the IEEE International Conference on Computer Vision (ICCV), 2017, 11 pages.
Sun et al., "Integral Human Pose Regression," Proceedings of the European Conference on Computer Vision (ECCV), 2018, 17 pages.
Dabral et al., "Learning 3D Human Pose from Structure and Motion," Proceedings of the European Conference on Computer Vision (ECCV), 2018, 16 pages.
Mehta et al., "VNect: Real-time 3D Human Pose Estimation with a Single RGB Camera," ACM Transactions on Graphics, Jul. 2017, 13 pages.
Martinez et al., "A simple yet effective baseline 3d human pose estimation," Proceedings of the IEEE International Conference on Computer Vision (ICCV), 2017, 10 pages.
Pavllo et al., "3D human pose estimation in video with temporal convolutions and semi-supervised training," Proceedings of the IEEE/CVF Conference on Computer Vision and Pattern Recognition (CVPR), 2019, 13 pages.
Ci et al., "Optimizing Network Structure for 3D Human Pose Estimation," Proceedings of the IEEE/CVF International Conference on Computer Vision (ICCV), 2019, pp. 2262-2271.

Cai et al., "Exploiting Spatial-temporal Relationships for 3D Pose Estimation via Graph Convolutional Networks," Proceedings of the IEEE/CVF International Conference on Computer Vision (ICCV), 2019, pp. 2272-2281.
Vision.imar.ro, "Human3.6M," retrieved from http://vision.imar.ro/human3.6m/description.php, retrieved on May 11, 2023, 1 page.
Mehta et al., "Monocular 3D Human Pose Estimation In The Wild Using Improved CNN Supervision," International Conference on 3D Vision, Qingdao, China, 2017, 2 pages.
Max Planck Institute for Intelligent Systems Perceiving Systems, "HumanEva Dataset," retrieved from http:/humaneva.is.tue.mpg.de/, retrieved on May 11, 2023, 4 pages.
Chunyu Wang et al., "Robust Estimation of 3D Human Poses from a Single Image," Jun. 9, 2014, (Jun. 9, 2014), XP055538630, Retrieved from the internet: URL: https://arxiv.org/pdf/1406.2282.pdf.
Ching-Hang Chen et al., "Unsupervised 3D Pose Estimation with Geometric Self-Supervision", arxiv.org, Cornell University Library, 201 Olin Library Cornell University Ithaca, NY 14853, Apr. 9, 2019 (Apr. 9, 2019), XP081167203.
Cao Zhe et al., "OpenPose: Realtime Multi-Person 2D Pose Estimation using Part Affinity Fields", IEEE transactions on pattern analysis and machine intelligence, May 30, 2019 (May 30, 2019), pp. 1-14, XP055849326, Retrieved from the Internet: URL: https://arxiv.org/pdf/1812.08008.pdf [retrieved on Oct. 8, 2021].
Wang Junying et al., "Img2Motion: Learning to Drive 3D Avatars using Videos", EasyChair Preprint, No. 1633, Oct. 11, 2019 (Oct. 11, 2019), pp. 1-5, XP093114047, Retrieved from the Internet: URL: https://easychair.org/publications/preprint_open/rf9K [retrieved on Dec. 20, 2023].
European Patent Office, "Extended European Search Report," issued in connection with European Patent Application No. 20931897.1, issued on Jan. 8, 2024, 9 pages.
Japan Patent Office, "Search Report by Registered Search Organization," issued in connection with Japanese Patent Application No. 2022-542299, dated Jan. 26, 2024, 44 pages. [English Translation Included.].
Wang et al., "Img2Motion: Learning to Drive 3D Avatars using Videos," EasyChair Preprint No. 1633, Oct. 11, 2019, 5 pages, URL: https://easychair.org/publications/preprint_open/rf9K.
Pavllo et al., "3D human pose estimation in video with temporal convolutions and semi-supervised training," arXiv:1811.11742v2 [cs.CV] Mar. 29, 2019, 13 pages, URL: https://arxiv.org/abs/1811.11742.pdf.
Villegas et al., "Neural Kinematic Networks for Unsupervised Motion Retargetting," IEEE, 2018 IEEE/CVF Conference on Computer Vision and Pattern Recognition, Jun. 23, 2018, 10 pages, URL: https://ieeexplore.ieee.org/document/8578999.
Chen et al., "Unsupervised 3D Pose Estimation With Geometric Self-Supervision," IEEE, 2019 IEEE/CVF Conference on Computer Vision and Pattern Recognition (CVPR), Apr. 9, 2019, 11 pages, URL: https://ieeexplore.ieee.org/document/8953799.
"Field Kenta Construction of the personal interaction system using other 4 person and an actual image crater," Journal of the Institute of Electrical Engineers of Japan, Jan. 1, 2014, vol. 134 , No. 1 [English Abstract Included].
Mehta et al., "Monocular 3D Human Pose Estimation in the Wild Using Improved CNN Supervision," 2017 International Conference on 3DVision (3DV), Oct. 12, 2017, DOI 10.1109/3DV.2017.00064, URL: https://ieeexplore.ieee.org/document/8374605.
Cao et al., "OpenPose: Realtime Multi-Person 2D Pose Estimation using Part Affinity Fields," arXiv:1812.08008v2 [cs.CV] May 30, 2019, URL: https://arxiv.org/pdf/1812.08008.pdf.
Japan Patent Office, "Notice of Reasons for Refusal," issued in connection with Japanese Patent Application No. 2022-542299, dated Feb. 6, 2024, 14 pages. [English Translation Included].
Japan Patent Office, "Notice of Allowance," issued in connection with Japanese Patent Application No. 2022-542299, dated Jul. 9, 2024, 4 pages. [English Machine Translation Included.]

* cited by examiner

KINEMATIC INTERACTION SYSTEM WITH IMPROVED POSE TRACKING

RELATED APPLICATION(S)

This patent arises from a national stage entry of International Patent Application Number PCT/CN2020/086412, which was filed on Apr. 23, 2020. Priority to International Patent Application Number PCT/CN2020/086412. International Patent Application Number PCT/CN2020/086412 is incorporated herein by reference in its entirety

BACKGROUND

Three-dimensional (3D) human pose estimation technology is used in many applications like human-computer interaction, biomechanics analysis in sports, 3D character animation for movies, games, and social virtual reality (VR). One goal of the technology is to localize the human body joints of one or multiple persons captured in a two-dimensional (2D) video in 3D space. However, this is very difficult to realize in practice. Predicting the 3D locations of body joints from captured 2D images typically uses datasets of images with corresponding 3D pose annotations, but trying to make predictions from such datasets often leads to temporally incoherent outputs with visible jitters and unrealistic human poses across adjacent video frames. Accordingly, there are many non-trivial challenges with respect to correctly mapping human motion from captured 2D video or images into a recreated 3D image.

BRIEF DESCRIPTION OF THE DRAWINGS

Features and advantages of embodiments of the claimed subject matter will become apparent as the following Detailed Description proceeds, and upon reference to the Drawings, in which:

Figure 1:
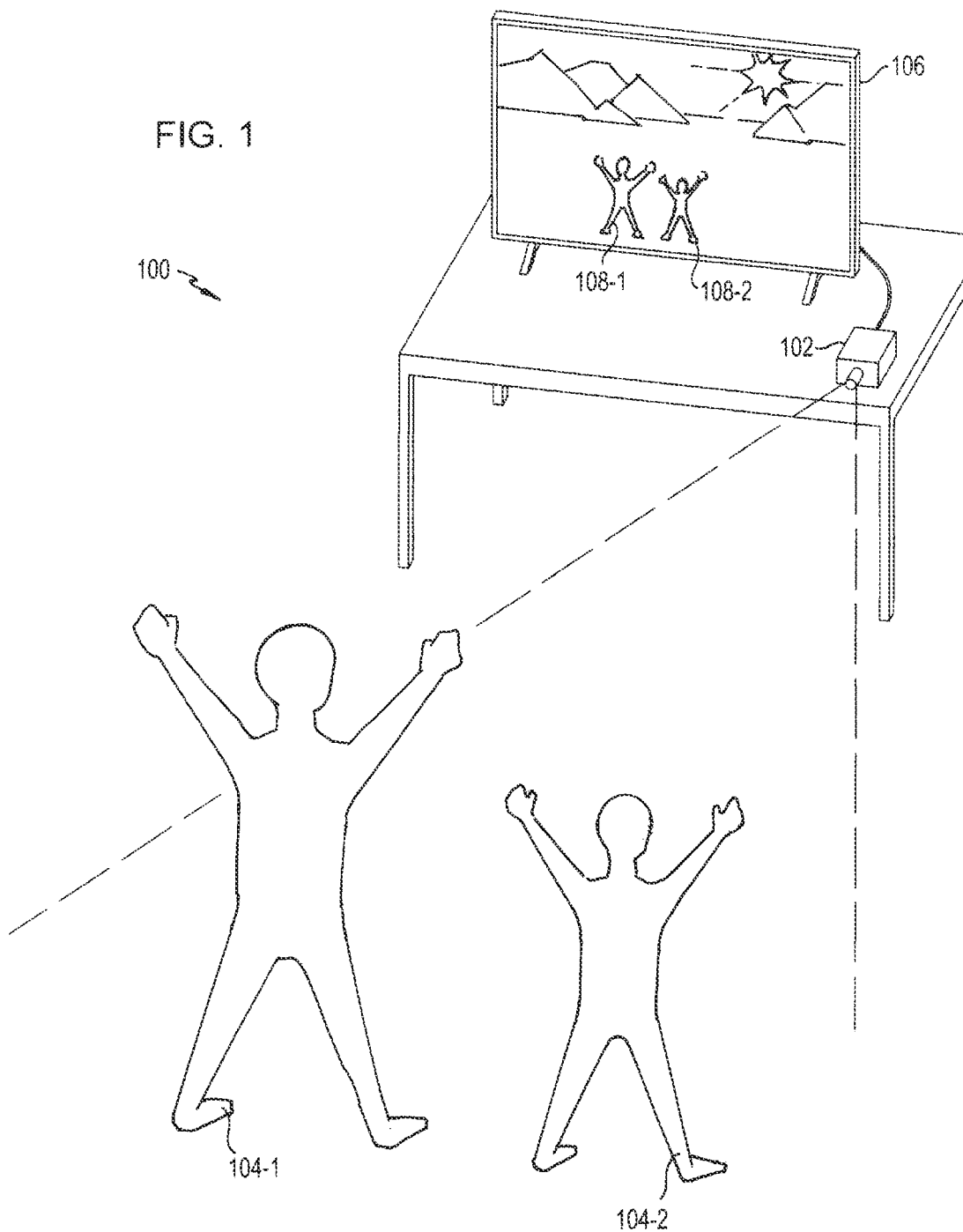
FIG. 1 illustrates an example environment where 3D pose tracking occurs for two individuals, in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

Techniques are disclosed for providing improved pose tracking of a subject captured in an image using a two-dimensional (2D) camera and generating a three-dimensional (3D) image that recreates the pose of the subject. The techniques may be implemented, for instance, as a kinematic interaction system configured to capture images or video of the subject using a single image capture device, such as an RGB camera, according to an embodiment. The kinematic interaction system includes at least one processor programmed or otherwise configured to map a pose or movements of the captured subject onto a displayed 3D image. In more detail, and according to an embodiment, the at least one processor is programmed to produce a 2D skeleton map associated with the subject in the one or more images and produce an estimated 3D skeleton map associated with the subject based at least on a plurality of 2D joint locations derived from the 2D skeleton map. In some such embodiments, the 3D skeleton map estimated from the 2D skeleton map using a trained neural network such as, for example, a deep neural network (DNN) or convolutional neural network (CNN). The estimated 3D skeleton map includes a plurality of 3D joint locations and a plurality of bone segments between corresponding pairs of 3D joint locations. As will be appreciated herein, the estimated 3D skeleton map may include some unnatural or unrealistic aspects which can be refined. In more detail, and according to an embodiment, the at least one processor accesses a template 3D skeleton map having a plurality of template 3D joint locations and a plurality of template bone segments between corresponding pairs of template 3D joint locations. The template 3D skeleton map may be generated, for example, by the processor or accessed via memory and can include bone segments that have set lengths using anthropometry statistics based on a given height of the template 3D skeleton map. With the template 3D skeleton map, the processor can produce an improved 3D skeleton map by at least retargeting one or more of the plurality of bone segments of the estimated 3D skeleton map to more closely match the corresponding template bone segments of the template 3D skeleton map. The improved 3D skeleton map can then be animated in various ways (e.g., using various skins or graphics) to track corresponding movements of the subject. Numerous applications, variations, and alternative embodiments will be appreciated in light of this disclosure.

General Overview

As previously noted, there a number of non-trivial issues that remain with respect to generating 3D images that accurately track the movement of a subject. One of the biggest problems with existing 3D human pose estimation methods is that the training set used to estimate the 3D pose is often not applicable to real-life scenarios. For example, deep learning methods with a training dataset having many images with corresponding 3D pose annotations are used to estimate a 3D pose given a captured 2D image of a subject. But such training datasets use models that are typically captured in-doors or in some other well-controlled environment. Due to the gap between the data training set models and real live models captured in real environments, the trained models often fail to produce robust 3D tracking results. Furthermore, direct prediction of 3D poses from the deep learning models can lead to temporally incoherent output with visible jitter, varying bone segments, and unrealistic human poses across adjacent video frames due to a lack of anatomical constraints that govern body structure and motion.

Thus, techniques are provided herein that yield improved 3D poses mapped to a subject by using real anatomical constraints on the estimated 3D skeleton map, according to an embodiment. Briefly, an estimated 3D skeleton map is adjusted using a template 3D skeleton map having anatomically correct bone segments and positions. The various joint locations of the adjusted 3D skeleton map are converted into joint angles, and an improved set of joint angles are found by minimizing an objective function that represents a relationship between the various skeleton maps, according to an embodiment. Once an improved 3D skeleton map has been generated, it can be animated to track movement of the subject. Various skins can be applied to the improved 3D skeleton map to create a variety of different avatar animations. The animation may be performed using any standard 3D animation software, such as Maya, Blender, Unreal Engine, or Unity. Although any number of applications can benefit from the techniques as will be appreciated, they are particularly useful in the context of games and virtual reality applications.

As will be further appreciated, although description herein focuses on the tracking of human subjects, the kinematic interaction system can be used to track the movement of any subject for which there is some stored dataset of images (e.g., for use in training a DNN or CNN). These subjects may be organic or non-organic entities. Accordingly, use of terms such as "bone segments" can be more broadly attributed to segments between the joint locations of any subject, including inorganic subjects (e.g., posable manikins or dummies, or a robot, or any other object having a pseudo-skeletal structure). Additionally, in some embodiments, more than one subject may be tracked simultaneously if they are both present together in the captured 2D images. As used herein, the capturing of 2D images encompasses both single images and images captured sequentially to produce a video or a series of temporally related images.

According to some specific example embodiments, a system designed to generate a 3D pose of a subject includes an image capturing device and at least one processor. The image capturing device is configured to capture one or more images of the subject. The at least one processor is configured to: receive the one or more images from the image capturing device; produce a two-dimensional (2D) skeleton map associated with the subject in the one or more images, wherein the 2D skeleton map comprises a plurality of 2D joint locations; produce an estimated three-dimensional (3D) skeleton map associated with the subject in the one or more images based at least on the plurality of 2D joint locations, wherein the estimated 3D skeleton map comprises a plurality of 3D joint locations and a plurality of bone segments between corresponding pairs of 3D joint locations, access a template 3D skeleton map having a plurality of template 3D joint locations and a plurality of template bone segments between corresponding pairs of template 3D joint locations; produce an improved 3D skeleton map by at least retargeting one or more of the plurality of bone segments of the estimated 3D skeleton map to more closely match the corresponding template bone segments of the template 3D skeleton map; and animate the improved 3D skeleton map based on corresponding movement of the subject.

According to another example embodiment, a computer-implemented method of generating a 3D pose of a subject includes: receiving one or more images of the subject captured by an image capturing device; producing a two-dimensional (2D) skeleton map associated with the subject in the one or more images, wherein the 2D skeleton map comprises a plurality of 2D joint locations; producing an estimated three-dimensional (3D) skeleton map associated with the subject in the one or more images based at least on the plurality of 2D joint locations, wherein the estimated 3D skeleton map comprises a plurality of 3D joint locations and a plurality of bone segments between corresponding pairs of 3D joint locations; accessing a template 3D skeleton map having a plurality of template 3D joint locations and a plurality of template bone segments between corresponding pairs of template 3D joint locations; producing an improved 3D skeleton map by at least retargeting one or more of the plurality of bone segments of the estimated 3D skeleton map to more closely match the corresponding template bone segments of the template 3D skeleton map; and animating the improved 3D skeleton map based on corresponding movement of the subject.

According to another example embodiment, a computer program product is disclosed that includes one or more non-transitory machine-readable mediums having instructions encoded thereon that, when executed by one or more processors, cause a process to be carried out for generating a 3D pose of a subject. The process may include any of the method discussed above.

The description uses the phrases "in an embodiment" or "in embodiments." which may each refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Kinematic Interaction System Overview

FIG. 1 illustrates an example kinematic environment 100 in which the movement of one or more subjects is tracked and used to generate 3D representations of the subjects on a display screen, according to an embodiment. Kinematic environment 100 may represent a room in a home, such as a living room, or it may be an outdoor location where subjects are moving around, such as at a sporting event.

According to an embodiment, an image capturing device 102 is present to capture 2D images of subjects 104-1 and 104-2. Although two subjects are present in this example, it should be understood that images of any number of subjects can be captured with image capturing device 102. According to an embodiment, image capturing device 102 represents a single camera for capturing only 2D images of subjects 104-1 and 104-2. For example, image capturing device 102 may be a single RGB camera.

Image capturing device 102 may be connected to a display 106 either wired or wirelessly in order to display 3D representations of subjects 104-1 and 104-2. According to some embodiments, at least one processor within image capturing device 102 creates 3D avatars 108-1 and 108-2 on display 106 to track the movements of subjects 104-1 and 104-2, respectively. According to some embodiments, the at least one processor is present within display 106. In some other embodiments, the at least one processor is located in a device separate from both image capturing device 102 and display 106.

3D Avatars 108-1 and 108-2 may be generated such that the avatars interact with a displayed environment in some way. For example, if display 106 showed an object flying towards avatar 108-1, then subject 104-1 may need to duck or perform some other maneuver so that 3D avatar 108-1 similarly ducks to avoid the flying object on display 106. Any other similar interactions would be readily apparent.

Figure 2:
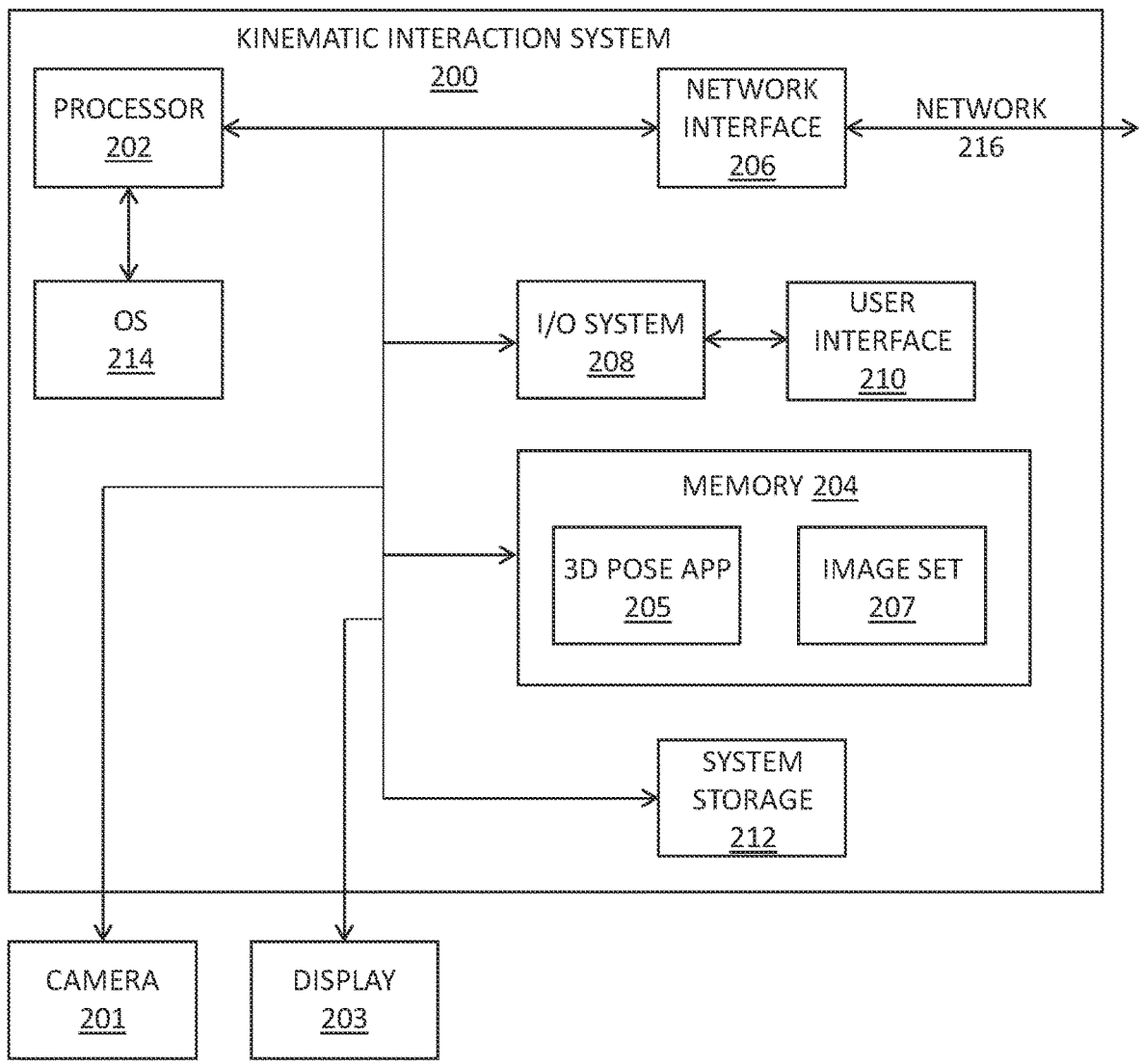
FIG. 2 illustrates a block diagram of an example kinematic interaction system, configured in accordance with an embodiment of the present disclosure.

FIG. 2 illustrates an example kinematic interaction system 200, configured in accordance with certain embodiments of the present disclosure. In some embodiments, kinematic interaction system 200 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. In some embodiments, kinematic interaction system 200 is a stand-alone computing system that interfaces with an external camera 201 and display 203. In some embodiments, kinematic interaction system 200 includes either or both of camera 201 and display 203. Camera 201 may represent a single RGB camera that captures 2D images of one or more subjects. Display 203 may be any display device that provides a visual image. Examples of display 203 can include touchscreen displays, computer monitors, television displays, high definition displays, projector systems, holographic displays, heads-up displays (HUD), liquid crystal displays (LCD), or light emitting diode (LED) displays.

In some embodiments, kinematic interaction system 200 may comprise any combination of a processor 202, a memory 204, a network interface 206, an input/output (I/O) system 208, a user interface 210, and a storage system 212. As can be further seen, a bus and/or interconnect is also provided to allow for communication between the various components listed above and/or other components not shown. Kinematic interaction system 200 can be coupled to a network 216 through network interface 206 to allow for communications with other computing devices, platforms, or resources. Other componentry and functionality not reflected in the block diagram of FIG. 2 will be apparent in light of this disclosure, and it will be appreciated that other embodiments are not limited to any particular hardware configuration.

Processor 202 can be any suitable processor and may include one or more coprocessors or controllers to assist in control and processing operations associated with kinematic interaction system 200. In some embodiments, processor 202 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Processor 202 may be designed to execute software that produces a 2D skeleton map over a subject in an image captured from camera 201 and forms a 3D skeleton map based off of the 2D skeleton map. As will be discussed herein, and in accordance with some embodiments, the process of forming the 3D skeleton map is improved by using a template 3D skeleton map to correct anatomical abnormalities. In some embodiments, processor 202 estimates a 3D skeleton map from the 2D skeleton map using a DNN or CNN trained using a dataset of various subject poses. In some embodiments, processor 202 outputs the final 3D skeleton map onto display 203 either directly (e.g., a skeletal image) or with some form of skin to create a 3D avatar on display 203.

Memory 204 can be implemented using any suitable type of digital storage including, for example, flash memory and/or random-access memory (RAM). In some embodiments, memory 204 may include various layers of memory hierarchy and/or memory caches. Memory 204 may be implemented as a volatile memory device such as, but not limited to, a RAM, dynamic RAM (DRAM), or static RAM (SRAM) device. Storage system 212 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 212 may comprise technology to increase the storage performance enhanced protection for valuable digital media when multiple hard drives are included. Memory 204 can represent any number of memory devices.

In some embodiments, memory 204 stores the various layers and nodes of the neural network (e.g., DNN or CNN) accessed by processor 202 to create the 3D skeleton map. In some embodiments, processor 202 stores one or more of the 2D images captured by camera 202, one or more of the 2D skeleton maps, and/or one or more of the 3D skeleton maps in memory 204. More generally, memory 204 may include a 3D pose application 205 that includes operations to be performed by processor 202 to generate an improved 3D skeleton map that tracks the pose of a subject captured in one or more 2D images taken from camera 201. At least some of the various operations performed by 3D pose application 205 are described herein with reference to FIG. 3. In some embodiments, memory 204 includes an image set 207 having a database of different 3D poses along with joint locations for the poses that may be used to train or update the neural network.

Processor 202 may be configured to execute an Operating System (OS) 214 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with kinematic interaction system 200, and therefore may also be implemented using any suitable existing or subsequently-developed platform.

Network interface 206 can be any appropriate network chip or chipset which allows for wired and/or wireless connection between other components of kinematic interaction system 200 and/or network 216, thereby enabling kinematic interaction system 200 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 208 may be configured to interface between various I/O devices and other components of kinematic interaction system 200. I/O devices may include, but not be limited to, a user interface 210. User interface 210 may include devices (not shown) such as a display element, touchpad, keyboard, mouse, and speaker, etc. I/O system 208 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI). DisplayPort, wireless HDMI, and/or any other suitable interface using wireless high definition compliant techniques. In some embodiments, the graphics subsystem could be integrated into processor 202 or any chipset of kinematic interaction system 200.

It will be appreciated that in some embodiments, the various components of the kinematic interaction system 200 may be combined or integrated in a system-on-a-chip (SoC) architecture. In some embodiments, the components may be hardware components, firmware components, software components or any suitable combination of hardware, firmware or software.

In various embodiments, kinematic interaction system 200 may be implemented as a wireless system, a wired system, or a combination of both. When implemented as a wireless system, kinematic interaction system 200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency spectrum and so forth. When implemented as a wired system, kinematic interaction system 200 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Methodology for Improving the 3D Skeleton Map

Figure 3:
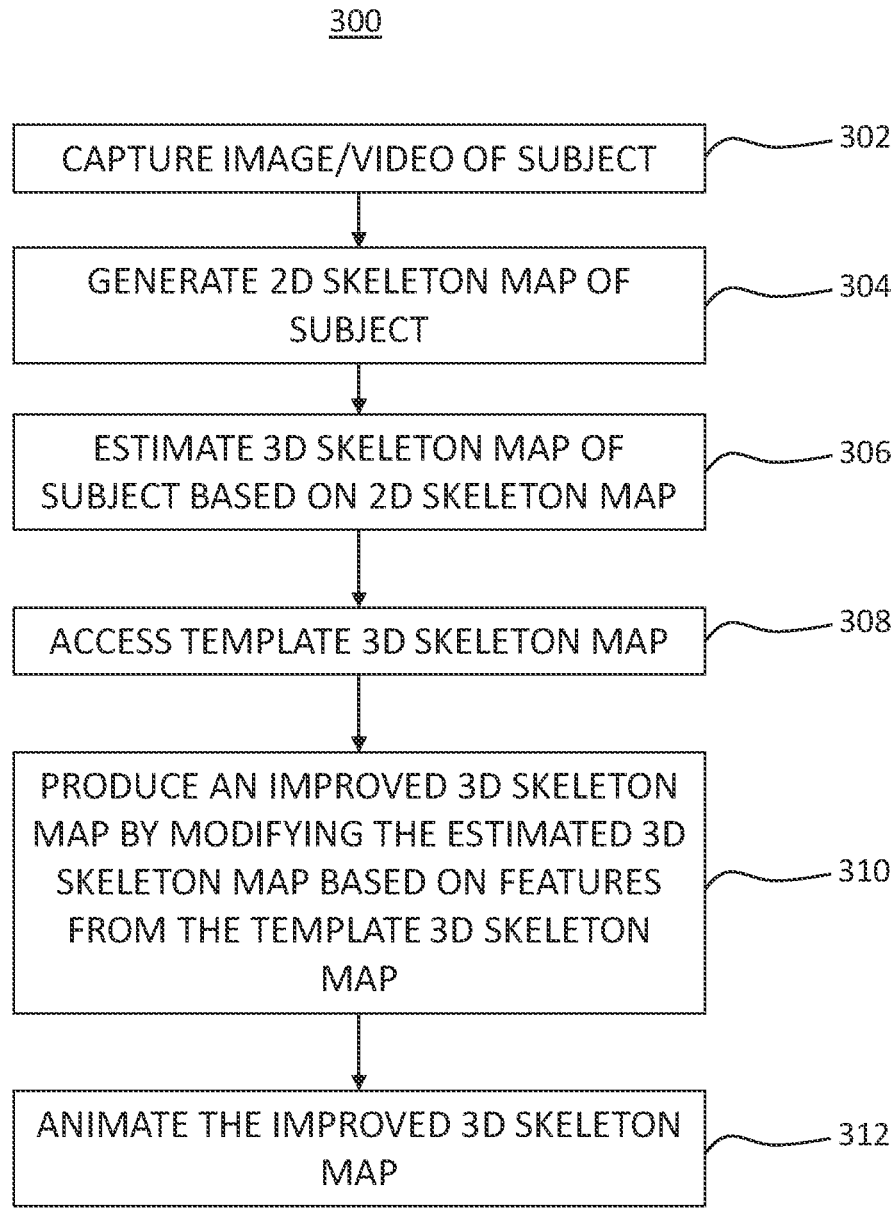
FIG. 3 is a method of generating a 3D pose of a subject, in accordance with an embodiment of the present disclosure.

FIG. 3 is a flow diagram of an example method 300 for generating a 3D pose of a subject, according to an embodiment of the present disclosure. Method 300 may be performed, for example, using one or more of the illustrated components of kinematic interaction system 200. More generally, method 300 and other methods described herein may be implemented in hardware or combinations of hardware and software. In another embodiment, method 300 may be implemented by a custom circuit with custom processing circuits, such as one or more application specific integrated circuits (ASICs) configured to carry out method 300. In addition, while the methods described herein may appear to have a certain order to their operations, other embodiments may not be so limited. Accordingly, the order of the operations can be varied between embodiments, as would be apparent in light of this disclosure.

Figure 4A:
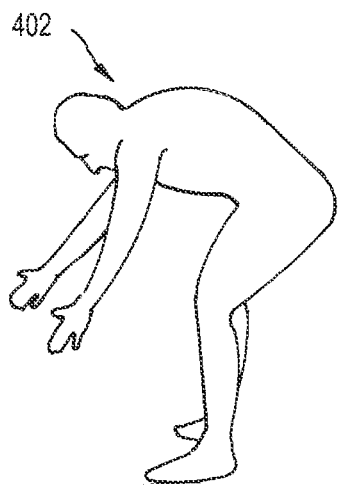
FIG. 4A illustrates an example pose of a subject, captured from a 2D image, in accordance with an embodiment of the present disclosure.

Method 300 begins with operation 302 where one or more images of a subject are captured, according to an embodiment. The captured images may be single images or video. According to an embodiment, the images are captured using a single camera, such as a single RGB camera. FIG. 4A illustrates one example of a captured image of a subject 402 in a particular pose. The captured image may contain the entirety of subject 402 or only a portion of subject 402. Additional subjects may also be present within a single captured image or video frame.

Figure 4B:
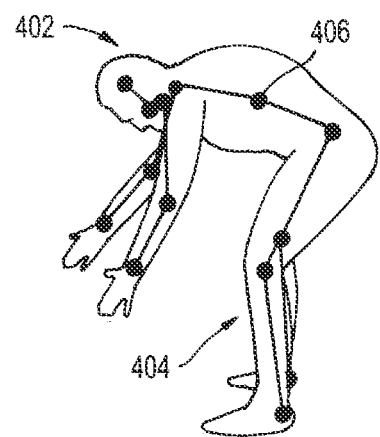
FIG. 4B illustrates a 2D skeleton map superimposed over the subject, in accordance with an embodiment of the present disclosure.

Method 300 continues with operation 304 where a 2D skeleton map of the subject is generated, according to an embodiment. 2D pose detector software, such as OpenPose, may be used to generate the 2D skeleton map based on the captured image of the subject, although any other 2D pose detection software or algorithm can be used as well. The 2D skeleton map ($S_{2d}$) may be represented as a series of 2D joint locations such that $S_{2d} = \{p_{2d}^i\}_{i=1}^J$, for J total joint locations in the image space. FIG. 4B illustrates an example 2D skeleton map 404 superimposed over subject 402, according to an embodiment. 2D skeleton map includes a plurality of 2D joint locations 406 to recreate the pose of subject 402 in 2D space. Additionally, in some embodiments, bone length segments are provided to form the mapping between each of 2D joint locations 406.

According to some embodiments, besides predicting locations of the various 2D joint locations, the 2D pose detector software also outputs a set of confidence scores with each score ($C_{2d}^i$) representing the detection credibility of its associated 2D joint location ($p_{2d}^i$). The confidence score may be based on how well the particular 2D joint location is recognized in the captured image of subject 402. For example, a low confidence score is expected for self-occluded 2D joint locations and a higher confidence score is expected for non-occluded ones. The confidence scores may also be affected by the pose of the subject, as some poses may be more difficult than others for identifying particular 2D joint locations on the subject.

According to some embodiments, tracking algorithms are used to identify more than one subject present in the captured image. Separate 2D skeleton maps are produced for each identified subject and a unique label is ascribed to each subject to identify the subject in any later-captured images. In some embodiments, one or more noise filter algorithms can be applied to the 2D skeleton map to provide more stable and smooth results. Some example noise filter algorithms include the Euro filter or Kalman filter.

According to some embodiments, the 2D skeleton map is normalized before being used to estimate the 3D skeleton map in order to account for minor variations in the environment or subject from the captured 2D image. The normalization procedure for the 2D joint locations may be performed using the following equation:

$$\vec{p}_{2d}^i = (p_{2d}^i - p_{2d}^0) * \frac{1}{\lambda} \quad (1)$$

The zeroth 2D joint location ($p_{2d}^0$) is set to be a pelvis joint location and all other 2D joint locations are normalized based on their distance from the zeroth 2D joint location. A scale factor ($1/\lambda$) may be set as the largest distance between the zeroth 2D joint location and all of the other 2D joint locations.

Method 300 proceeds with operation 306 where a 3D skeleton map of the subject is estimated based on the 2D skeleton map, according to an embodiment. The 3D skeleton map estimation may use the locations of the various 2D joint locations ($p_{2d}^i$) as an input to a neural network trained to identify a closest-fit 3D pose representation based on the inputted 2D joint locations. According to some embodiments, the normalized versions of the 2D joint locations are used to generate the 3D skeleton map, as discussed above. According to some embodiments, the neural network used to estimate the 3D skeleton map from the 2D joint locations may be trained using any publicly available 3D pose dataset. Some example datasets include H3.6M, MPI-INF-3DHP, and the HumanEva dataset. According to some embodiments, the output produced by the neural network includes at least a plurality of 3D joint locations used to build the 3D skeleton map.

Figure 4C:
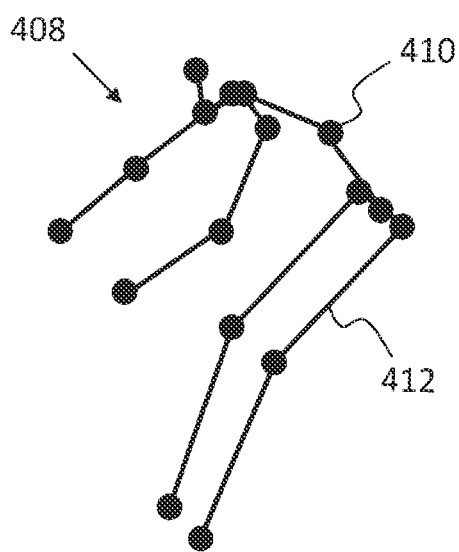
FIG. 4C illustrates a 3D skeleton map derived from the 2D skeleton map of FIG. 4B, in accordance with an embodiment of the present disclosure.

FIG. 4C illustrates an example 3D skeleton map 408 of subject 402 that may be estimated based on 2D skeleton map 404, according to an embodiment. 3D skeleton map 408 includes plurality of 3D joint locations 410 connected to one another using bone segments 412. While the estimated 3D skeleton map 408 may be used to represent subject 402, the accuracy of the representation may suffer without further optimization. Thus, and in accordance with some embodiments, 3D skeleton map 408 undergoes additional processing to provide an improved 3D skeleton map.

Figure 5A:
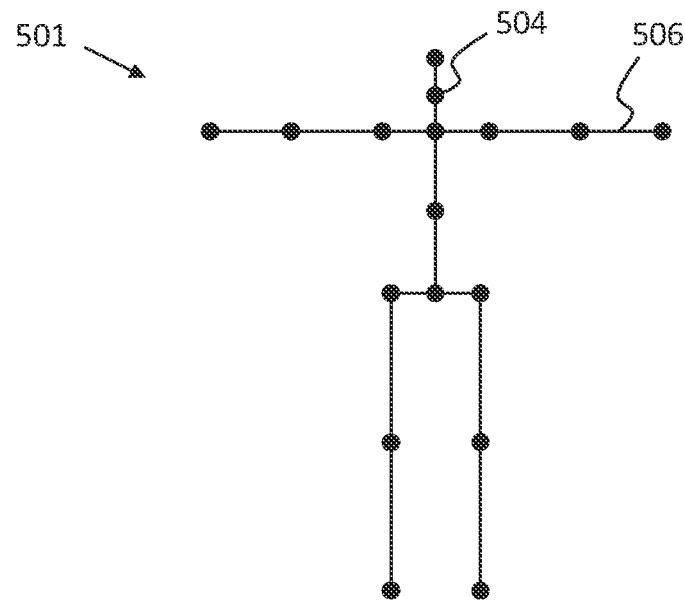
FIG. 5A illustrates an example of a template 3D skeleton map, in accordance with an embodiment of the present disclosure.

Method 300 proceeds with operation 308 where a template 3D skeleton map is accessed, according to an embodiment. The template 3D skeleton map may be arranged in a "rest" pose, such as the example template 3D skeleton map 501 of FIG. 5A. In this example, template 3D skeleton map 501 includes a plurality of template joint locations 504 and a plurality of template bone segments 506 that connect the template joint locations 504 to one another. The pose of the template 3D skeleton map may be chosen to ensure that each template joint location 504 is not occluded. Other non-occluded "rest" poses are possible to use beyond the one illustrated in FIG. 5A, as will be appreciated. According to an embodiment, the lengths of the various template bone segments 506 can be determined using anthropometry statistics if the height of the 3D skeleton map 501 is known. In some embodiments, a default height is used for the template 3D skeleton map, such as a default height of 165 cm, which may represent an average height of an adult human. In some embodiments, the height of the template 3D skeleton map may be any value set by a user, such that an accurate height of a given subject may be provided to form a template 3D skeleton map that more closely fits the size of the given subject. In some embodiments, a height may be derived based on some inputted parameters such as the gender and age of the subject. In still other embodiments, a height estimation algorithm can be used, such as an algorithm that estimates height of a subject based on depicted features, possibly including other objects depicted in the 2D image. Whichever way the height of the template 3D skeleton map is determined, the template bone segments between the template joint locations can be calculated based on the height to produce the full template 3D skeleton map.

The template 3D skeleton map may be stored in memory, and thus accessed from memory (e.g., in situations where a template has been previously custom made for subject 402). In another example, the template 3D skeleton map is generated based on the rest pose and the height, which can be obtained in any of the different ways discussed above.

Figure 4D:
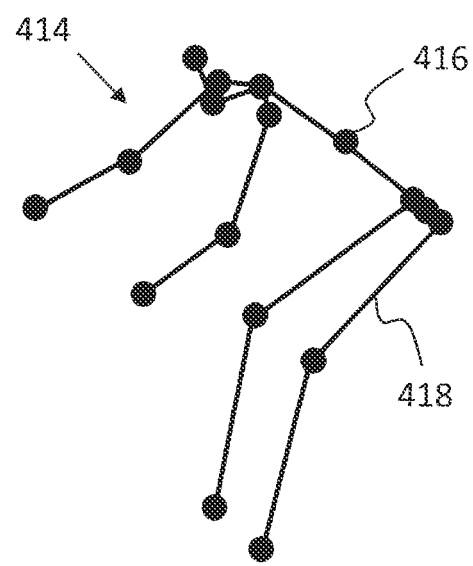
FIG. 4D illustrates an improved 3D skeleton map that accounts for more accurate bone segments, in accordance with an embodiment of the present disclosure.

Method 300 continues with operation 310 where an improved 3D skeleton map is generated, according to an embodiment. The improved 3D skeleton map is generated by altering the estimated 3D skeleton map output from the neural network using the template 3D skeleton map, according to an embodiment. A more detailed process for how the improved 3D skeleton map is produced is discussed further herein with reference to FIG. 6. Generally, the process involves updating the lengths of one or more of the bone segments in the estimated 3D skeleton map based on the anthropometrically correct lengths of the bone segments in the template 3D skeleton map and adjusting the joint angles accordingly. An example of the improved 3D skeleton map for subject 402 is illustrated in FIG. 4D. The improved 3D skeleton map 414 includes updated joint locations 416 (e.g., straighter spine) along with updated bone segments 418 (e.g., more properly spaced legs and bent knee position). Further note the change in the angle at the elbow of the right arm, which now more naturally bows inward rather than outward).

Method 300 continues with operation 312 where the improved 3D skeleton map produced in operation 310 is either displayed or animated on a screen, according to an embodiment. In some examples, the improved 3D skeleton map is displayed without any skin or other graphics overlaying the skeletal frame. In some examples, a skin is applied over the improved 3D skeleton map to produce a more realistic looking form that can be animated to track with movements of the subject. Any existing animation software can be used including Maya, Blender, Unreal Engine, or Unity, to name a few examples.

Figure 6:
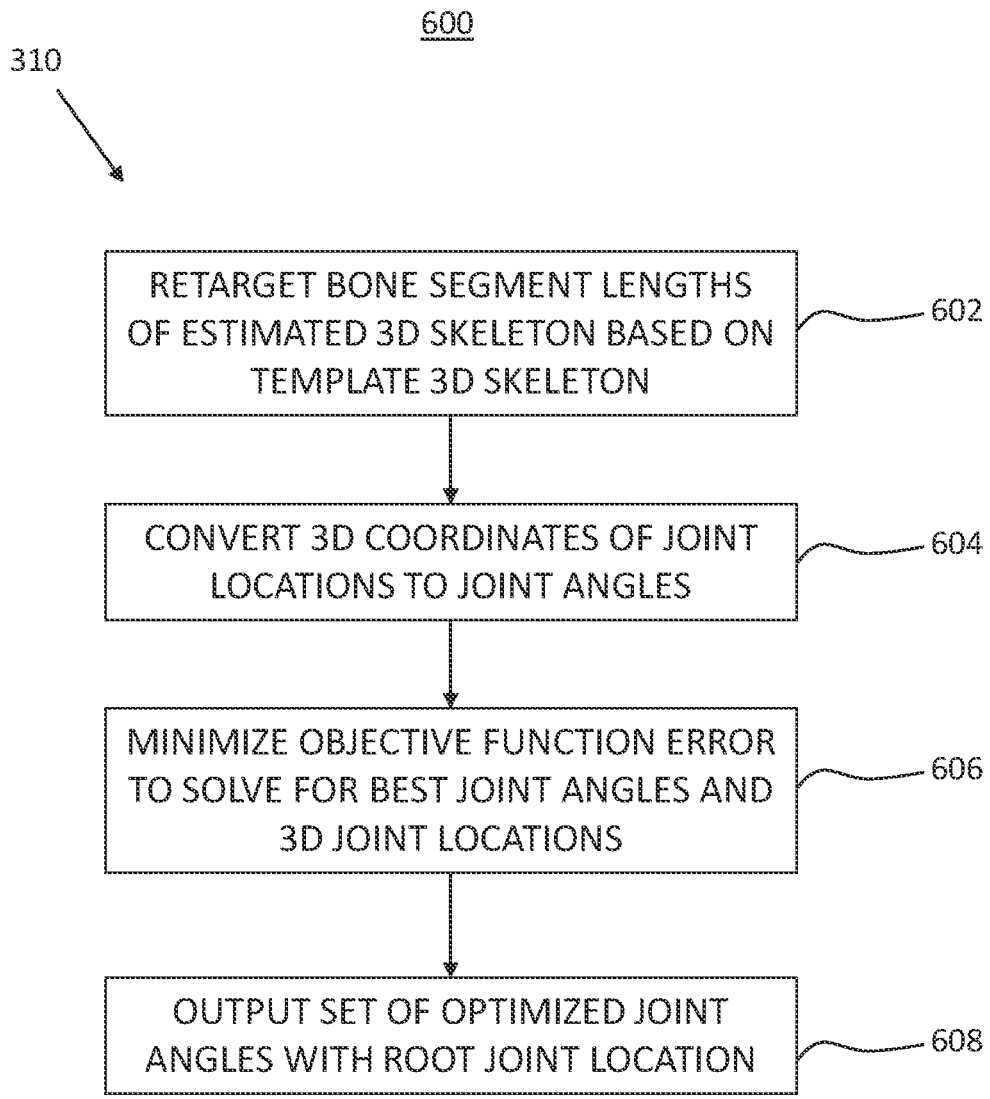
FIG. 6 is a method of improving an estimated 3D skeleton map by minimizing an objective function, in accordance with an embodiment of the present disclosure.

FIG. 6 is a flow diagram of an example method 600 for generating an improved 3D skeleton map based on an estimated 3D skeleton map and a template 3D skeleton map, according to an embodiment. As will be appreciated, this method 600 shows further details of operation 310 from method 300. Method 600 may be performed, for example, using one or more of the illustrated components of kinematic interaction system 200. More generally, method 600 and other methods described herein may be implemented in hardware or combinations of hardware and software. In another embodiment, method 600 may be implemented by a custom circuit with custom processing circuits, such as one or more application specific integrated circuits (ASICs) configured to carry out method 600. In addition, while the methods described herein may appear to have a certain order to their operations, other embodiments may not be so limited. Accordingly, the order of the operations can be varied between embodiments, as would be apparent in light of this disclosure.

Method 600 begins with operation 602 where the lengths of one or more of the bone segments in the estimated 3D skeleton map are retargeted to more closely match the lengths of the corresponding bone segments in the template 3D skeleton map, according to an embodiment. Changing the bone segment lengths based on actual anthropometry statistics helps to ensure that the neural network output produces results that are anatomically possible, and more closely matched to real-body physics. The bone segments of the estimated 3D skeleton map are changed while keeping their relative directions the same, according to an embodiment. The estimated 3D skeleton map with the retargeted bone segment lengths is herein referred to as the retargeted 3D skeleton map.

Figure 5B:
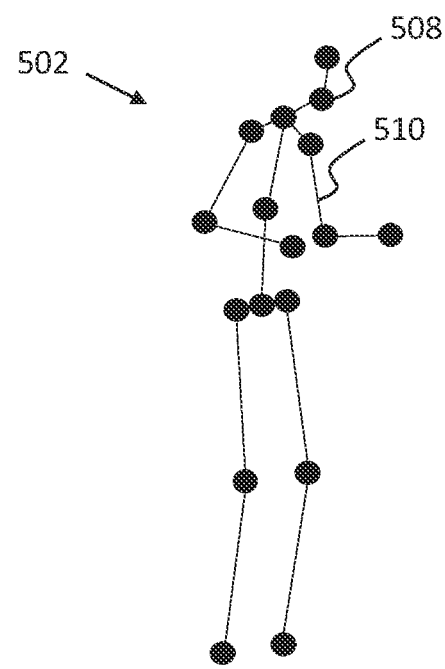
FIG. 5B illustrates an example of a 3D skeleton map represented as a set of joint angles, in accordance with an embodiment of the present disclosure.

Method 600 continues with operation 604 where the 3D coordinates of the various joint locations of the retargeted 3D skeleton map are converted into their corresponding joint angles, according to an embodiment. For example, the retargeted 3D skeleton map ($S_{3d}^{user}$) may instead be represented by $S(\theta)$ where $\theta = \{\vec{\omega_0}, \vec{\omega_4}, \vec{\omega_5}, \vec{\omega_1}, \vec{\omega_2}, \vec{\omega_0'}, \vec{\omega_7}, \vec{\omega_{3_t}}, \vec{\omega_3}, \vec{\omega_{8_r}}, \vec{\omega_{11}}, \vec{\omega_{12}}, \vec{\omega_{9_l}}, \vec{\omega_{14}}, \vec{\omega_{15}}\}_{15 \times 3}$, where $\vec{\omega_k} \in \mathbb{R}^3$ denotes the axis-angle representation of the relative rotation of each numbered 3D joint location (k) with respect to its parent in a kinematic tree. For example, the template 3D skeleton map 501 from FIG. 5A may represent a skeletal map using a zero vector for $\theta$, while retargeted 3D skeleton map 502 from FIG. 5B includes some joint rotation $\theta$ that affects the locations and orientations of the various retargeted 3D joint locations 508 and retargeted bone segments 510. In some embodiments, the various joint angles are provided with reference to a root joint location. In some examples, the root joint location is the pelvis joint of the subject.

Method 600 continues with operation 606 where the various joint angles $\theta$ of the retargeted 3D skeleton map along with the 3D coordinates of a root joint $r_{3d}$ are determined in order to generate the improved 3D skeleton map, according to an embodiment. The various parameters may be determined by minimizing the error of an objective function $E(\theta, r_{3d})$, according to an embodiment. The objective function may be defined as provided in the equations below:

$$E(\theta, r_{3d}) = w_1 * E_{key}(\theta, r_{3d}) + w_2 * E_{init}(\theta) + w_3 * E_{prior}(\theta) + w_4 * E_{temporal}(\theta, r_{3d}) \quad (2)$$

$$E_{key}(\theta, r_{3d}) = \|C_{2d} \cdot (\Pi(S_{3d}(\theta), r_{3d}) - S_{2d})\|_2 \quad (3)$$

$$E_{init}(\theta) = \|S_{3d}(\theta) - S_{3d}^{user}\|_2 \quad (4)$$

$$E_{prior}(\theta) = -\log(G(\theta; \mu_\theta, \Sigma)) \quad (5)$$

$$E_{temporal}(\theta, r_{3d}) = \|(S_{3d}(\theta) + r_{3d}) - (S_{3d}(\theta^{t-1}) + r_{3d}^{t-1})\|_2 \quad (6)$$

In the above equations, $E_{key}$ measures the distance between the projection of an absolute 3D pose and the input 2D joint locations from the 2D skeleton map, and $\Pi$ represents a projection function from camera 3D space to the 2D image plane, which may be given when the camera intrinsic parameters are known. In the above equations. $E_{init}$ represents a measure of the similarity between the improved 3D skeleton map and the estimated 3D skeleton map predicted by the neural network. The function $G(\theta; \mu_\theta, \Sigma)$ is a Gaussian function that defines a probability distribution to represent a level of reasonableness of the pose from the estimated 3D skeleton map, which may be learned in advance from the 3D human pose dataset used by the neural network. Accordingly, the function $E_{prior}$ is used to favor probable poses over improbable ones. The function $E_{temporal}$ represents changes to the 3D pose in the temporal domain (e.g., changes to the pose due to movement of the subject between times t and t-1) and may be provided to achieve more temporally stable results. The parameters $w_1$, $w_2$, $w_3$, $w_4$ are used as scalar weights. According to an embodiment, the error in the objective function $E(\theta, r_{3d})$ is minimized to solve for $\theta$, $r_{3d}$ using a non-linear least squares regression. For example, the initial joint angle $\theta^{init}$ may be computed from the retargeted 3D skeleton map $S_{3d}^{user}$, and the initial set of 3D coordinates for the root joint location $r_{3d}^{init}$ may be achieved by minimizing the function $\|C_{2d} \cdot (\Pi(S_{3d}^{user} + r_{3d}^{init}) - S_{2d})\|_2$, where $S_{2d}$ represents the set of 2D joint locations from the 2D skeleton map and $C_{2d}$ represents the confidence interval for each of the 2D joint locations.

Method 600 proceeds with operation 608 where the optimized set of joint angles are output as the improved 3D skeleton map $S_{3d}(\theta^{opt})$ along with a 3D root joint location $r_{3d}^{opt}$ (e.g., the pelvis joint of the subject). From this optimized set of parameters, the final 3D skeleton map is ready for animation and/or application of various skins or graphics to form the image shown on a display.

Example Application

Figure 7A:
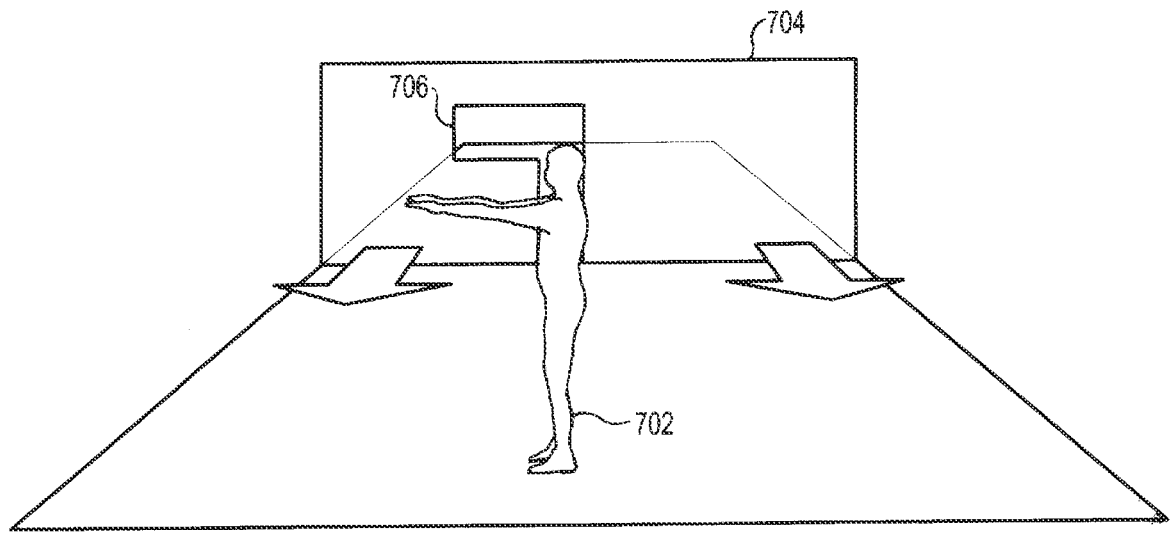
FIGS. 7A-7C illustrate an example application of the kinematic interaction system, configured in accordance with some embodiments of the present disclosure.
Figure 7B:
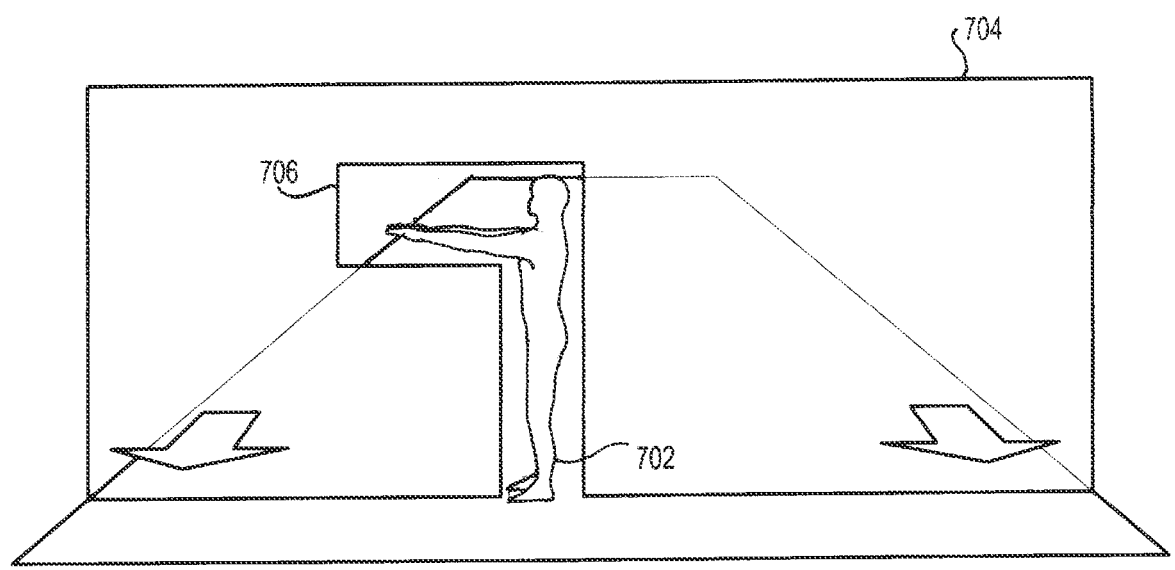
Figure 7C:
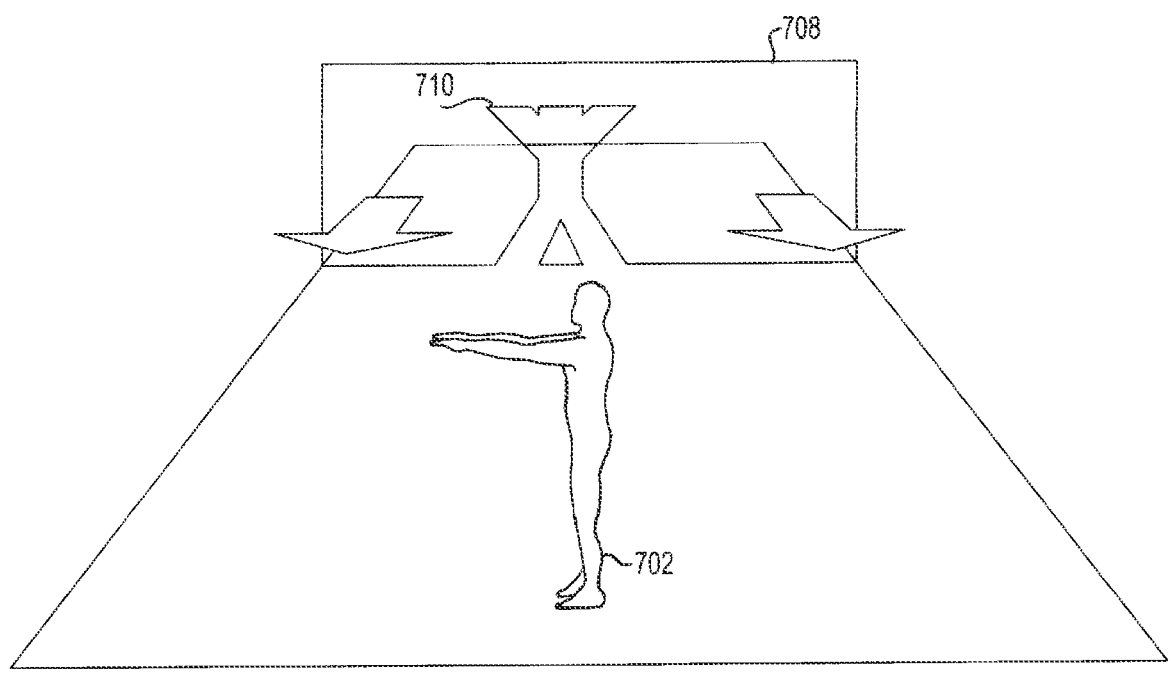

FIGS. 7A-7C illustrate an example application of using the improved 3D skeleton map of a moving subject as part of an interactive game, according to an embodiment. As shown in FIG. 7A, a human avatar 702 may be shown on a display. Avatar 702 may mimic the pose of a subject that is watching the display in order to interact with what is happening on the display. Accordingly, avatar 702 is generated by rendering graphics over an improved 3D skeleton map of the subject, where the improved 3D skeleton map is produced using any of the techniques disclosed herein. Although only one avatar 702 is shown in this example, any number of avatars may be generated for any number of users that are present within 2D images captured by an image capturing device.

The illustrated application is a moving wall game where a displayed wall 704 having an opening 706 moves towards avatar 702. Opening 706 has a specific shape that requires a certain pose from avatar 702 to pass through opening 706. In the illustrated example, opening 706 has an inverted 'L' shape, requiring avatar 702 to extend the arms outward while standing straight up to pass through opening 706. The object of the interactive game is to use different poses to pass through whatever openings are formed in wall 704 without touching any part of wall 704. FIG. 7B illustrates the wall 704 having moved towards avatar 702 such that avatar 702 passes through opening 706. After passing through one wall, another wall may come forward with an opening having a different shape. For example, FIG. 7C illustrates a second wall 708 that is generated after avatar 702 passes through the first wall 704. Second wall may have a differently-shaped opening 710 such that the subject would need to change their pose to change corresponding pose of avatar 702 to pass through the new opening 710. As can be seen, this next opening is 'X' shaped, requiring an X-shaped pose by avatar 702. The speed at which the walls come towards avatar 702 may increase over time. The pose of avatar 702 mimics the pose of the actual subject playing the interactive game by using any of the techniques disclosed herein.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, is a functional apparatus and may comprise, for example, singly or in any combination, hardwired circuitry, programmable circuitry such as one or more computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software stored in a machine-readable medium and that can be executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Thus, a circuit or circuitry is a functional physical apparatus that can be any of integrated circuitry, printed circuit board circuitry, gate-level logic, analog and/or digital circuitry, one or more programmed processors or processing entities (e.g., combination of instructions and one or more processors configured to execute those instructions).

Further Example Embodiments

The following examples pertain to further embodiments, from which numerous permutations and configurations will be apparent.

Example 1 is a system designed to generate a 3D pose of a subject. The system includes at least one processor that is configured to receive one or more images from an image capturing device configured to capture the one or more images of the subject; produce a two-dimensional (2D) skeleton map associated with the subject in the one or more images, wherein the 2D skeleton map comprises a plurality of 2D joint locations; produce an estimated three-dimensional (3D) skeleton map associated with the subject in the one or more images based at least on the plurality of 2D joint locations, wherein the estimated 3D skeleton map comprises a plurality of 3D joint locations and a plurality of bone segments between corresponding pairs of 3D joint locations; produce an improved 3D skeleton map by at least retargeting a corresponding length of one or more of the plurality of bone segments of the estimated 3D skeleton map to more closely match a corresponding length of corresponding one or more template bone segments of a template 3D skeleton map, the template 3D skeleton map having a plurality of template 3D joint locations and a plurality of template bone segments between corresponding pairs of template 3D joint locations; and animate the improved 3D skeleton map based on corresponding movement of the subject.

Example 2 includes the subject matter of Example 1, further comprising the image capturing device, wherein the image capturing device comprises a single RGB camera.

Example 3 includes the subject matter of Example 1 or 2, wherein the at least one processor is configured to produce the estimated 3D skeleton map by inputting data associated with the 2D skeleton map into a neural network, wherein the neural network is configured to output at least the plurality of 3D joint locations.

Example 4 includes the subject matter of any one of Examples 1-3, wherein the at least one processor is further configured to generate the template 3D skeleton map.

Example 5 includes the subject matter of Example 4, wherein generating the template 3D skeleton map comprises setting a height of the template 3D skeleton map and determining the lengths of the template bone segments using anthropometry statistics.

Example 6 includes the subject matter of any one of Examples 1-5, wherein the retargeting generates a retargeted 3D skeleton map, and the at least one processor is further configured to convert 3D joint locations of the retargeted 3D skeleton map to a plurality of joint angles relative to a root joint location.

Example 7 includes the subject matter of Example 6, wherein producing the improved 3D skeleton map comprises minimizing the error of an objective function that relates the retargeted 3D skeleton map, the estimated 3D skeleton map, and the 2D skeleton map to solve for the joint angles and the root joint location of the improved 3D skeleton map.

Example 8 includes the subject matter of any one of Examples 1-7, further comprising a display configured to show a version of the animated improved 3D skeleton map.

Example 9 includes the subject matter of any one of Examples 1-8, wherein the at least one processor is further configured to normalize the 2D joint locations based on a distance between each of the 2D joint locations and a 2D root joint location.

Example 10 includes the subject matter of Example 9, wherein the 2D root joint location represents a pelvis joint of the subject.

Example 11 includes the subject matter of any one of Examples 1-10, wherein the at least one processor is further configured to: produce a second 2D skeleton map associated with a second subject in the one or more images, wherein the second 2D skeleton map comprises a second plurality of 2D joint locations, produce a second estimated three-dimensional (3D) skeleton map associated with the second subject in the one or more images based at least on the second plurality of 2D joint locations, wherein the second estimated 3D skeleton map comprises a second plurality of 3D joint locations and a second plurality of bone segments between corresponding pairs of second 3D joint locations; produce a second improved 3D skeleton map by at least retargeting a corresponding length of one or more of the second plurality of bone segments of the second estimated 3D skeleton map to more closely match a corresponding length of one or more corresponding second template bone segments of a second template 3D skeleton map, the second template 3D skeleton map having a second plurality of template 3D joint locations and a second plurality of template bone segments between corresponding pairs of second template 3D joint locations; and animate the second improved 3D skeleton map based on corresponding movement of the second subject.

Example 12 is a computer-implemented method of generating a 3D pose of a subject. The method includes receiving one or more images of the subject captured by an image capturing device; producing a two-dimensional (2D) skeleton map associated with the subject in the one or more images, wherein the 2D skeleton map comprises a plurality of 2D joint locations; producing an estimated three-dimensional (3D) skeleton map associated with the subject in the one or more images based at least on the plurality of 2D joint locations, wherein the estimated 3D skeleton map comprises a plurality of 3D joint locations and a plurality of bone segments between corresponding pairs of 3D joint locations; producing an improved 3D skeleton map by at least retargeting lengths of one or more of the plurality of bone segments of the estimated 3D skeleton map to more closely match lengths of corresponding template bone segments of a template 3D skeleton map, the template 3D skeleton map having a plurality of template 3D joint locations and a plurality of template bone segments between corresponding pairs of template 3D joint locations; and animating the improved 3D skeleton map based on corresponding movement of the subject.

Example 13 includes the subject matter of Example 12, wherein producing the estimated 3D skeleton map comprises inputting data associated with the 2D skeleton map into a neural network, wherein the neural network is configured to output at least the plurality of 3D joint locations.

Example 14 includes the subject matter of Example 13 or 14, further comprising generating the template 3D skeleton map.

Example 15 includes the subject matter of Example 14, wherein generating the template 3D skeleton map comprises setting a height of the template 3D skeleton map and determining the lengths of the template bone segments using anthropometry statistics.

Example 16 includes the subject matter of Example 15, wherein setting the height of the template 3D skeleton map comprises setting a predetermined height.

Example 17 includes the subject matter of Example 15, wherein setting the height of the template 3D skeleton map comprises acquiring a height value via a user input.

Example 18 includes the subject matter of any one of Examples 12-17, wherein the retargeting generates a retargeted 3D skeleton map, and the method further includes converting 3D joint locations of the retargeted 3D skeleton map to a plurality of joint angles relative to a root joint location.

Example 19 includes the subject matter of Example 18, wherein producing the improved 3D skeleton map comprises minimizing the error of an objective function that relates the retargeted 3D skeleton map, the estimated 3D skeleton map, and the 2D skeleton map to solve for the joint angles and the root joint location of the improved 3D skeleton map.

Example 20 includes the subject matter of any one of Examples 12-19, further comprising normalizing the 2D joint locations based on a distance between each of the 2D joint locations and a 2D root joint location.

Example 21 includes the subject matter of Example 20, wherein the 2D root joint location represents a pelvis joint of the subject.

Example 22 includes the subject matter of any one of Examples 12-21, further comprising producing a second 2D skeleton map associated with a second subject in the one or more images, wherein the second 2D skeleton map comprises a second plurality of 2D joint locations; producing a second estimated three-dimensional (3D) skeleton map associated with the second subject in the one or more images based at least on the second plurality of 2D joint locations, wherein the second estimated 3D skeleton map comprises a second plurality of 3D joint locations and a second plurality of bone segments between corresponding pairs of second 3D joint locations; producing a second improved 3D skeleton map by at least retargeting a corresponding length of one or more of the second plurality of bone segments of the second estimated 3D skeleton map to more closely match a corresponding length of one or more corresponding second template bone segments of a second template 3D skeleton map, the second template 3D skeleton map having a second plurality of template 3D joint locations and a second plurality of template bone segments between corresponding pairs of second template 3D joint locations; and animating the second improved 3D skeleton map based on corresponding movement of the second subject.

Example 23 is a computer program product that includes one or more non-transitory machine-readable mediums having instructions encoded thereon that, when executed by one or more processors, cause a process to be carried out for generating a 3D pose of a subject. The process includes receiving one or more images of the subject captured by an image capturing device; producing a two-dimensional (2D) skeleton map associated with the subject in the one or more images, wherein the 2D skeleton map comprises a plurality of 2D joint locations, producing an estimated three-dimensional (3D) skeleton map associated with the subject in the one or more images based at least on the plurality of 2D joint locations, wherein the estimated 3D skeleton map comprises a plurality of 3D joint locations and a plurality of bone segments between corresponding pairs of 3D joint locations; and producing an improved 3D skeleton map by at least retargeting a length of one of the plurality of bone segments of the estimated 3D skeleton map to more closely match a corresponding length of a corresponding template bone segment of a template 3D skeleton map, the template 3D skeleton map having a plurality of template 3D joint locations and a plurality of template bone segments between corresponding pairs of template 3D joint locations.

Example 24 includes the subject matter of Example 23, wherein producing the estimated 3D skeleton map comprises inputting data associated with the 2D skeleton map into a neural network, wherein the neural network is configured to output at least the plurality of 3D joint locations.

Example 25 includes the subject matter of Example 23 or 24, the process further comprising generating the template 3D skeleton map.

Example 26 includes the subject matter of Example 25, wherein generating the template 3D skeleton map comprises setting a height of the template 3D skeleton map and/or determining the lengths of the template bone segments using anthropometry statistics.

Example 27 includes the subject matter of Example 26, wherein setting the height of the template 3D skeleton map comprises setting a predetermined height.

Example 28 includes the subject matter of Example 26, wherein setting the height of the template 3D skeleton map comprises acquiring a height value via a user input.

Example 29 includes the subject matter of any one of Examples 23-28, wherein the retargeting generates a retargeted 3D skeleton map, and the process further comprises converting 3D joint locations of the retargeted 3D skeleton map to a plurality of joint angles relative to a root joint location.

Example 30 includes the subject matter of Example 29, wherein producing the improved 3D skeleton map comprises minimizing the error of an objective function that relates the retargeted 3D skeleton map, the estimated 3D skeleton map, and the 2D skeleton map to solve for the joint angles and the root joint location of the improved 3D skeleton map.

Example 31 includes the subject matter of any one of Examples 23-30, the process further comprising normalizing the 2D joint locations based on a distance between each of the 2D joint locations and a 2D root joint location.

Example 32 includes the subject matter of Example 31, wherein the 2D root joint location represents a pelvis joint of the subject.

Example 33 includes the subject matter of any one of Examples 23-32, the process further including producing a second 2D skeleton map associated with a second subject in the one or more images, wherein the second 2D skeleton map comprises a second plurality of 2D joint locations; producing a second estimated three-dimensional (3D) skeleton map associated with the second subject in the one or more images based at least on the second plurality of 2D joint locations, wherein the second estimated 3D skeleton map comprises a second plurality of 3D joint locations and a second plurality of bone segments between corresponding pairs of second 3D joint locations; and producing a second improved 3D skeleton map by at least retargeting a corresponding length of one of the second plurality of bone segments of the second estimated 3D skeleton map to more closely match a corresponding length of a corresponding second template bone segment of a second template 3D skeleton map, the second template 3D skeleton map having a second plurality of template 3D joint locations and a second plurality of template bone segments between corresponding pairs of second template 3D joint locations.

Example 34 includes the subject matter of Example 33, the process further including animating the second improved 3D skeleton map based on corresponding movement of the second subject.

Example 35 includes the subject matter of any one of Examples 23-34, the process further including animating the improved 3D skeleton map based on corresponding movement of the subject.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A system to generate a 3D pose of a subject, the system comprising:
   memory;
   instructions; and
   one or more processor circuits to be programmed by the instructions to:
   access one or more images of the subject from an image capturing device;
   produce a two-dimensional (2D) skeleton map associated with the subject in the one or more images, the 2D skeleton map including a plurality of 2D joint locations;
   produce an estimated three-dimensional (3D) skeleton map associated with the subject in the one or more images based at least on the plurality of 2D joint locations, the estimated 3D skeleton map including a plurality of 3D joint locations and a plurality of bone segments between corresponding pairs of 3D joint locations;
   produce an improved 3D skeleton map by at least retargeting a corresponding length of one or more of the plurality of bone segments of the estimated 3D skeleton map to more closely match a corresponding length of one or more corresponding template bone segments of a template 3D skeleton map, the template 3D skeleton map having a plurality of template 3D joint locations and a plurality of template bone segments between corresponding pairs of template 3D joint locations;
   animate the improved 3D skeleton map based on corresponding movement of the subject;
   produce a second 2D skeleton map associated with a second subject in the one or more images, the second 2D skeleton map including a second plurality of 2D joint locations;
   produce a second estimated 3D skeleton map associated with the second subject in the one or more images based at least on the second plurality of 2D joint locations, the second estimated 3D skeleton map including a second plurality of 3D joint locations and a second plurality of bone segments between corresponding pairs of second 3D joint locations;
   produce a second improved 3D skeleton map by at least retargeting a corresponding length of one or more of the second plurality of bone segments of the second estimated 3D skeleton map to more closely match a corresponding length of one or more corresponding second template bone segments of a second template 3D skeleton map, the second template 3D skeleton map having a second plurality of template 3D joint locations and a second plurality of template bone segments between corresponding pairs of second template 3D joint locations; and animate the second improved 3D skeleton map based on corresponding movement of the second subject.

2. The system of claim 1, further including the image capturing device, the image capturing device including a single RGB camera.

3. The system of claim 1, wherein at least one of the one or more processor circuits is to produce the estimated 3D skeleton map by inputting data associated with the 2D skeleton map into a neural network, the neural network to output at least the plurality of 3D joint locations.

4. The system of claim 3, further including the image capturing device, wherein the 2D skeleton map is produced independent of the neural network.

5. The system of claim 1, wherein at least one of the one or more processor circuits is to generate the template 3D skeleton map by setting a height of the template 3D skeleton map and determining the lengths of the template bone segments using anthropometry statistics.

6. The system of claim 1, wherein the retargeting generates a retargeted 3D skeleton map, and at least one of the one or more processor circuits is to convert 3D joint locations of the retargeted 3D skeleton map to a plurality of joint angles relative to a root joint location.

7. The system of claim 6, wherein at least one of the one or more processor circuits is to produce the improved 3D skeleton map by minimizing an error of an objective function that relates the retargeted 3D skeleton map, the estimated 3D skeleton map, and the 2D skeleton map to solve for the joint angles and the root joint location of the improved 3D skeleton map.

8. The system of claim 1, wherein at least one of the one or more processor circuits is to normalize the 2D joint locations based on a distance between ones of the 2D joint locations and a 2D root joint location.

9. The system of claim 8, wherein the 2D root joint location represents a pelvis joint of the subject.

10. A computer-implemented method of generating a 3D pose of a subject, the method comprising:
accessing one or more images of the subject captured by an image capturing device;
producing a two-dimensional (2D) skeleton map associated with the subject in the one or more images, the 2D skeleton map including a plurality of 2D joint locations;
producing an estimated three-dimensional (3D) skeleton map associated with the subject in the one or more images based at least on the plurality of 2D joint locations, the estimated 3D skeleton map including a plurality of 3D joint locations and a plurality of bone segments between corresponding pairs of 3D joint locations;
producing, by executing instructions with processor circuitry, an improved 3D skeleton map by at least retargeting lengths of one or more of the plurality of bone segments of the estimated 3D skeleton map to more closely match lengths of corresponding template bone segments of a template 3D skeleton map, the template 3D skeleton map having a plurality of template 3D joint locations and a plurality of template bone segments between corresponding pairs of template 3D joint locations;
animating the improved 3D skeleton map based on corresponding movement of the subject;
producing a second 2D skeleton map associated with a second subject in the one or more images, the second 2D skeleton map including a second plurality of 2D joint locations;
producing a second estimated 3D skeleton map associated with the second subject in the one or more images based at least on the second plurality of 2D joint locations, the second estimated 3D skeleton map including a second plurality of 3D joint locations and a second plurality of bone segments between corresponding pairs of second 3D joint locations;
producing a second improved 3D skeleton map by at least retargeting a corresponding length of one or more of the second plurality of bone segments of the second estimated 3D skeleton map to more closely match a corresponding length of one or more corresponding second template bone segments of a second template 3D skeleton map, the second template 3D skeleton map having a second plurality of template 3D joint locations and a second plurality of template bone segments between corresponding pairs of second template 3D joint locations; and
animating the second improved 3D skeleton map based on corresponding movement of the second subject.

11. The computer-implemented method of claim 10, wherein producing the estimated 3D skeleton map includes inputting data associated with the 2D skeleton map into a neural network, the neural network to output at least the plurality of 3D joint locations.

12. The computer-implemented method of claim 11, wherein the 2D skeleton map is produced independent of the neural network.

13. The computer-implemented method of claim 10, further including generating the template 3D skeleton map by setting a height of the template 3D skeleton map and determining the lengths of the template bone segments using anthropometry statistics.

14. The computer-implemented method of claim 10, wherein the retargeting generates a retargeted 3D skeleton map, and the method further includes converting 3D joint locations of the retargeted 3D skeleton map to a plurality of joint angles relative to a root joint location.

15. The computer-implemented method of claim 14, wherein producing the improved 3D skeleton map includes minimizing an error of an objective function that relates the retargeted 3D skeleton map, the estimated 3D skeleton map, and the 2D skeleton map to solve for the joint angles and the root joint location of the improved 3D skeleton map.

16. The computer-implemented method of claim 10, further including normalizing the 2D joint locations based on a distance between ones of the 2D joint locations and a 2D root joint location.

17. The computer-implemented method of claim 16, wherein the 2D root joint location represents a pelvis joint of the subject.

18. At least one machine-readable storage device comprising instructions to cause at least one processor to at least:
access one or more images of a subject captured by an image capturing device;

produce a two-dimensional (2D) skeleton map associated with the subject in the one or more images, the 2D skeleton map including a plurality of 2D joint locations;

produce an estimated three-dimensional (3D) skeleton map associated with the subject in the one or more images based at least on the plurality of 2D joint locations, the estimated 3D skeleton map including a plurality of 3D joint locations and a plurality of bone segments between corresponding pairs of 3D joint locations;

produce an improved 3D skeleton map by at least retargeting a length of one of the plurality of bone segments of the estimated 3D skeleton map to more closely match a corresponding length of a corresponding template bone segment of a template 3D skeleton map, the template 3D skeleton map having a plurality of template 3D joint locations and a plurality of template bone segments between corresponding pairs of template 3D joint locations;

produce a second 2D skeleton map associated with a second subject in the one or more images, wherein the second 2D skeleton map includes a second plurality of 2D joint locations;

produce a second estimated 3D skeleton map associated with the second subject in the one or more images based at least on the second plurality of 2D joint locations, wherein the second estimated 3D skeleton map includes a second plurality of 3D joint locations and a second plurality of bone segments between corresponding pairs of second 3D joint locations; and produce a second improved 3D skeleton map by at least retargeting a corresponding length of one of the second plurality of bone segments of the second estimated 3D skeleton map to more closely match a corresponding length of a corresponding second template bone segment of a second template 3D skeleton map, the second template 3D skeleton map having a second plurality of template 3D joint locations and a second plurality of template bone segments between corresponding pairs of second template 3D joint locations.

19. The at least one machine-readable storage device of claim 18, wherein the instructions cause the at least one processor to produce the estimated 3D skeleton map by inputting data associated with the 2D skeleton map into a neural network, the neural network to output at least the plurality of 3D joint locations.

20. The at least one machine-readable storage device of claim 19, wherein the 2D skeleton map is produced independent of the neural network.

21. The at least one machine-readable storage device of claim 18, wherein the instructions cause the at least one processor to:
generate the template 3D skeleton map by setting a height of the template 3D skeleton map and/or determining the lengths of the template bone segments using anthropometry statistics; and
animate the improved 3D skeleton map based on corresponding movement of the subject.

22. The at least one machine-readable storage device of claim 18, wherein the retargeting generates a retargeted 3D skeleton map, and the instructions cause the at least one processor to convert 3D joint locations of the retargeted 3D skeleton map to a plurality of joint angles relative to a root joint location.

23. The at least one machine-readable storage device of claim 22, wherein the instructions cause the at least one processor to produce the improved 3D skeleton map by minimizing an error of an objective function that relates the retargeted 3D skeleton map, the estimated 3D skeleton map, and the 2D skeleton map to solve for the joint angles and the root joint location of the improved 3D skeleton map.

24. The at least one machine-readable storage device of claim 18, wherein the instructions cause the at least one processor to normalize the 2D joint locations based on a distance between ones of the 2D joint locations and a 2D root joint location.

25. The at least one machine-readable storage device of claim 24, wherein the 2D root joint location represents a pelvis joint of the subject.

* * * * *